United States Patent [19]
Fukuzaki

[11] Patent Number: 6,064,374
[45] Date of Patent: May 16, 2000

[54] CORDLESS ELECTRONIC PEN WITH CARTRIDGE

[75] Inventor: Yasuhiro Fukuzaki, Saitama-Ken, Japan

[73] Assignee: Wacom Co., Ltd., Saitama-ken, Japan

[21] Appl. No.: 08/975,064

[22] Filed: Nov. 20, 1997

[30] Foreign Application Priority Data

Jan. 30, 1997 [JP] Japan ................................ 9-031149

[51] Int. Cl.[7] .............................. G09G 5/00; G08C 21/00
[52] U.S. Cl. .................... 345/179; 178/19.01; 178/19.03
[58] Field of Search ..................... 345/173, 145, 345/179; 178/18.01, 18.03, 18.05, 18.06, 18.07, 19.01, 19.03, 19.04

[56] References Cited

U.S. PATENT DOCUMENTS

| | | | |
|---|---|---|---|
| 4,883,926 | 11/1989 | Baldwin | 178/18 |
| 5,548,092 | 8/1996 | Shriver | 178/18 |
| 5,635,682 | 6/1997 | Cherdak et al. | 178/18 |
| 5,646,650 | 7/1997 | Miller et al. | 345/179 |
| 5,652,412 | 7/1997 | Lazzouni et al. | 178/18 |
| 5,754,169 | 5/1998 | Yashiro | 345/173 |
| 5,898,422 | 4/1999 | Zetts | 345/145 |

*Primary Examiner*—Vijay Shankar
*Attorney, Agent, or Firm*—Finnegan, Henderson, Farabow, Garrett & Dunner, LLP

[57] ABSTRACT

The present invention increases the information-setting capability of an electronic pen by using exchangeable cartridges, each cartridge having a pre-installed information setting. The wiring of each cartridge is differentiated to designate information such as, for example, color or line width. The cartridge attributes may specify the stored information such as, for example, color. A cartridge may include a password or other specific ID of an individual. Both mechanical contact points and non-mechanical contact points can be used to actualize a cartridge. In addition, a rechargeable battery can be placed inside a cartridge, and the battery may be recharged using a battery recharging device. Information may be written and rewritten to a memory storage device inside a cartridge by connecting the cartridge to a separate writing device.

23 Claims, 8 Drawing Sheets

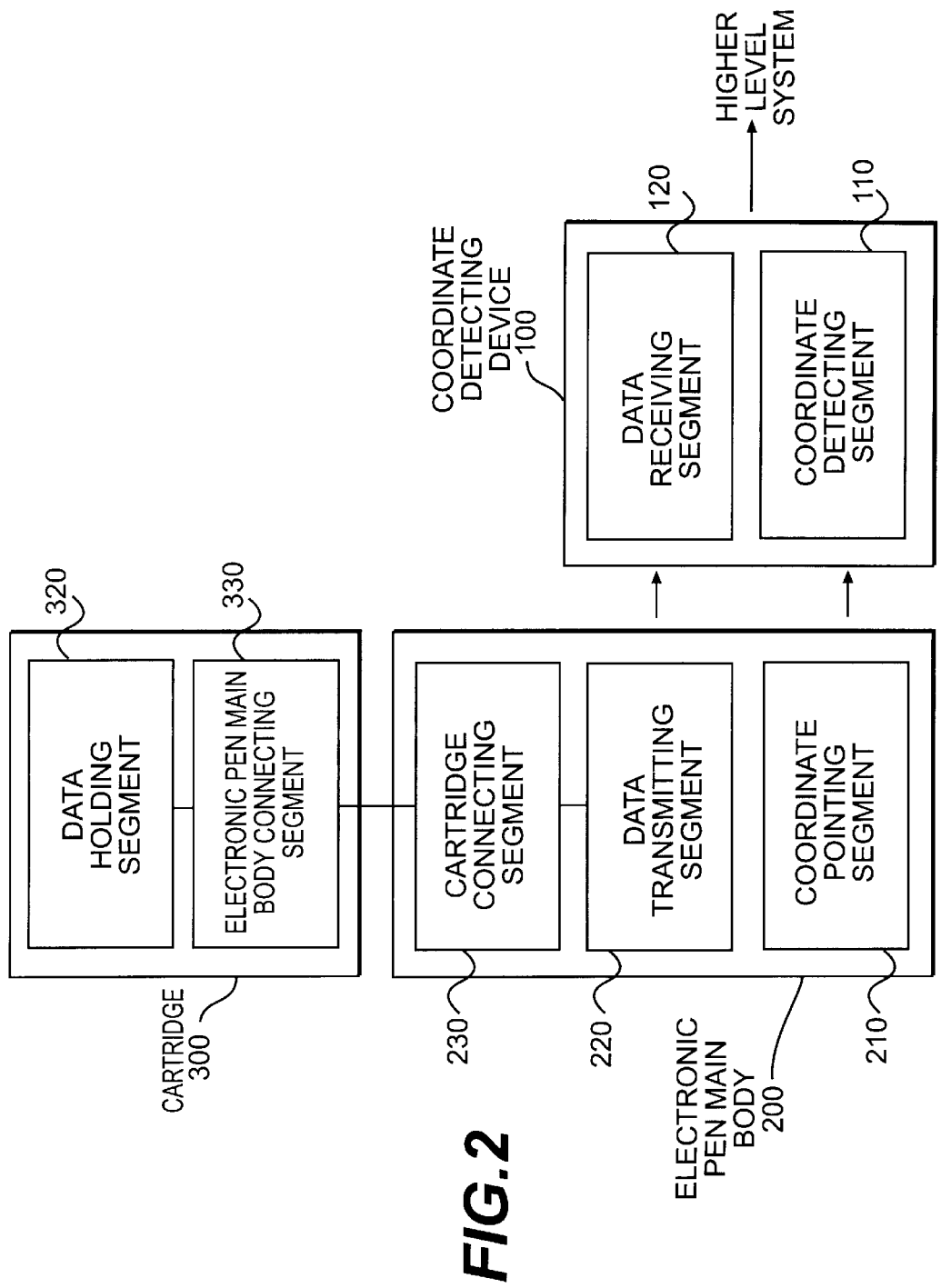

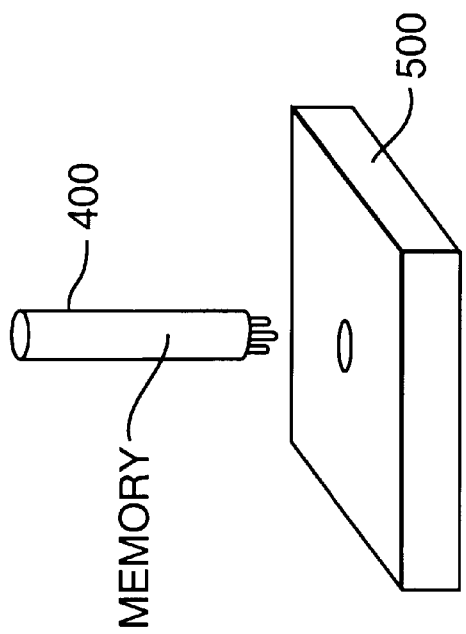
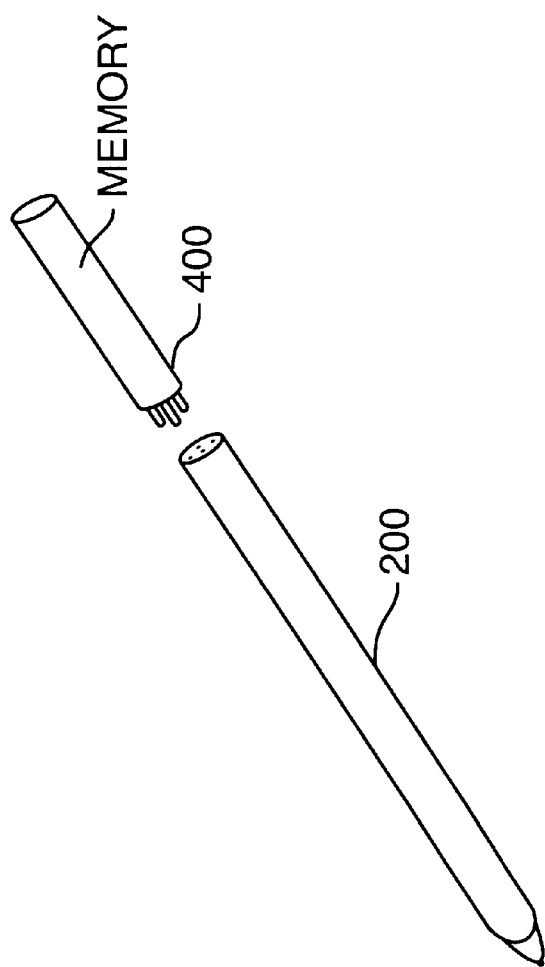

CORDLESS ELECTRONIC PEN WITH CARTRIDGE

BACKGROUND OF THE INVENTION

1. Field of the Invention

The present invention relates to a position pointing device and relates to storing information within a position pointing device used with a coordinate input device (an input device to a computer) such as a digitizer or tablet.

2. Description of the Related Art

Computer input devices transmit information to an attached computer. Such input devices include pen-shaped position pointing devices, and the input device may include coded information to increase the functions of the input device.

A position pointing device may include identification information that distinguishes the input information. For example, an electronic pen loaded with information for "red color" will automatically cause the "red color" to be selected when a figure is drawn and shown on a computer display. By loading a different color on a different pen, a set of electronic color pencils can be realized. By attaching a mechanism to an electronic pen to switch color, a multiple color ball point pen function can be realized. A pen may store information for different pen-tip widths and different types of ink. An electronic pen can be identified to start up a specific software application in accordance with the type of pen used. Another application is to limit access to information by enabling a personal ID information setting, and thus provide a security function through the ID setting system.

The loading of information onto an electronic pen is disclosed in several patent applications. A device for transmitting information from an electronic pen to a higher level computer via a position detecting device is disclosed in the following Japanese Laid Open Patent Applications: H3-189716, H3-189717, H7-182094, H7-225654, H7-234752, and H8-030374.

If a CPU for encoding information transmission is included in an electronic pen, the pen will require a power source. This may require the installment of a battery inside the electronic pen.

Small switches on the electronic pen can change the information setting. The switches, however, have to be very small in order for them to be installed in the electronic pen. Furthermore, the number of connecting points increases as the number of information settings increases.

At this time, acceptable switches hardly exist in the market, although different switches have been proposed. A rotary switch has plural connection points, but it is too big to be installed in an electronic pen. If such a rotary switch is condensed to a size small enough to fit on an electronic pen, the cost will undesirably increase. A DIP switch assembly is small, but it is for semi-permanent settings and is not designed for frequent changes. Therefore, the DIP switch lacks durability and is not suitable for a user to change settings frequently. A DIP rotary switch assembly is a DIP switch with a rotary dial shape that can be installed inside a big pen. The inventor of the current application tried a DIP rotary switch assembly as an experiment. It became unusable because the connecting points went bad even though it was not used heavily. No other rotary switch installable in a pen is found yet.

There is a problem of checking what is set by a switch operation. The size of an electronic pen should not be too large, thereby limiting the size for the display space to show a function setting.

As far as an ID setting as a security function is concerned, it is recommended to prohibit a user from conducting a setting operation from the security viewpoint. The ID information can be pre-installed permanently in the hardware, e.g. by a circuit on a printed board. However, to promote user convenience, the user could be allowed to conduct a setting operation using a password. To do this, a semiconductor memory needs to be loaded. In almost all cases, the processing for writing information becomes more complex than reading information. It is often the case that a separate power supply is required for writing. It is therefore difficult to load a function in the electronic pen necessary to write the information.

If a battery is installed, then a change of the battery will be required. This requires configuration of a thin pen with a complex structure. Even if the battery can be recharged, the battery still needs to be removable, which requires troublesome work.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention comprises a position pointing device for use with a position detecting device, comprising: a pen-shaped body; and a cartridge connected to the pen-shaped body, the connection allowing removal of the cartridge, and the cartridge including an information storage structure.

The invention also comprises a position pointing device for use with a position detecting device, comprising: a pen-shaped body; and a cartridge connected to the pen-shaped body, the connection allowing removal of the cartridge, and the cartridge including a power storage structure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 2 is a block diagram showing a basic embodiment of the cordless electronic pen with a cartridge;

FIGS. 6A and 6B are external views of a cartridge data writing device, a pen, and a cartridge with an internal rewriteable memory;

DESCRIPTION OF THE PREFERRED EMBODIMENT

The present invention proposes a cordless pen with a changeable cartridge. The cartridge stores preset information and replaces a setting switch on the pen. It is not difficult to find a connector which can fit to the axis of an electronic pen (pen axis: housing of the electronic pen). By changing the connected line of the cartridge in the connector, the corresponding information can be expressed. Information such as color, line width, ink type, and/or security codes may be stored on the cartridge. A cartridge may be given the function of an eraser.

The cartridge can be given a distinctive attribute to reflect the information stored in the cartridge. For example, a certain color can be assigned to a cartridge corresponding to the actual color of the cartridge. Thus, a user can easily identify the color setting. The shape of the cartridge can also be used to identify the information stored in the cartridge such as, for example, line width.

The cartridge method can also be applied to the security function. A specific personal ID is assigned to a cartridge, and the cartridge can be inserted into the pen when it is required to perform a security check.

Besides using a connector which has mechanical connection points, a cartridge can be used without having a physical connecting point. This is effective to overcome the life-span problem of the mechanical connecting points. Such methods include using an over current loss of an electric conductor, using a change in magnetic permeability rate in the magnetic field, using a union between coils, and using a capacitance union between electrodes.

If a battery necessary for an electronic pen as a power supply is loaded within a cartridge, by changing the cartridge the battery change is also done automatically. If the battery loaded in the cartridge is rechargeable, it can be recharged by connecting the cartridge to a recharging device.

The writing and rewriting of information to a storage device within a cartridge can be easily accomplished by connecting the cartridge to a writing device.

Reference will now be made in detail to the present preferred embodiments of the invention, examples of which are illustrated in the accompanying drawings.

The present invention is embodied in a position pointing device and an associated graphics tablet. The position pointing device inputs information such as graphics or a drawing by tracing on the graphics tablet. Examples of position pointing devices and graphics tablets are disclosed in U.S. Pat. Nos. 4,878,553 and 5,466,896, the disclosures of which are hereby incorporated by reference.

Figure 1:
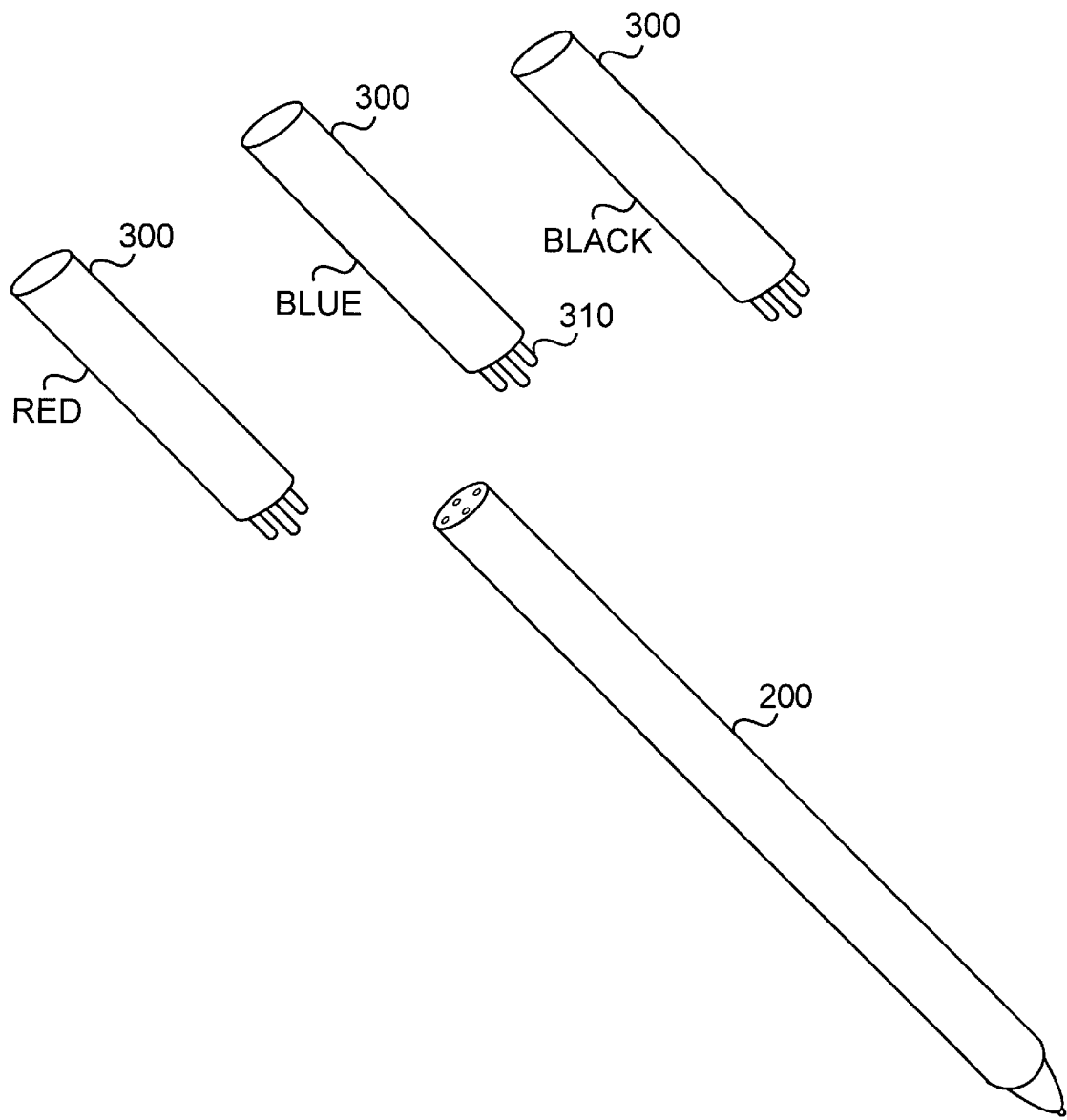
FIG. 1 is an external view of a cordless electronic pen with cartridges in accordance with the present invention.

FIG. 1 is an external view of a cordless electronic pen with a cartridge in accordance with the present invention. The main body of the electronic pen 200 is an input device for a digitizer (a coordinate detecting device). The electronic pen, having a similar shape to a regular writing pen, is used to point to a position on the coordinate detecting area of the coordinate detecting device.

The present invention can utilize any coordinate detecting principle such as electromagnetic induction, electrostatic induction, or an optical method as long as the method can detect the position and is capable of transmitting information from the electronic pen to the coordinate detecting device.

An electronic pen is used as an input device in a digitizer for a computer using an application software program such as a computer graphics program. FIG. 1 shows an example of making the external color of a cartridge 300 correspond to an assigned color, e.g., red, blue, or black respectively, providing a cartridge capable of attaching to and detaching from the main body of the electronic pen 200, and changing the cartridge 300 to the color which is to be inputted.

In this example, a connector segment comprising several pins 310 is shown. It is possible to combine both a mechanical connection and an electrical connection. It is also possible to use only pins for a mechanical connection, while an electronic connection is made through non-contact means (i.e., through electromagnetic induction or an electrostatic induction).

FIG. 2 shows a block diagram of a cordless electronic pen with a cartridge in accordance with the present invention. The coordinate detecting device 100 is a computer input device generally called a digitizer or a tablet, connected to a higher level system such as a personal computer and used for inputting coordinate data and other necessary information (line thickness, hue, etc.).

The coordinate detecting device 100 is comprised of the coordinate detecting segment 110 and the data reception segment 120. The coordinate detecting segment 110 detects the position pointed to by the coordinate pointing segment 210 of the main body of the electronic pen 200 as a coordinate. The data reception segment 120 receives the data transmitted from the data transmission segment 220 of the main body of the electronic pen.

The data detected by the coordinate detecting segment 110 and the data received by the data reception segment 120 are transmitted to the higher level system to be processed. The methods for the coordinate detection and the transmission/reception of data are disclosed in the systems proposed by the present assignee.

The cartridge 300 is comprised of the data holding segment 320 and the connecting segment 330 for the main body of the electronic pen. The data holding segment 320 only needs to hold data intrinsic to the cartridge; the simplest example thereof is shown by the short pattern in FIG. 3A.

Figure 3A:
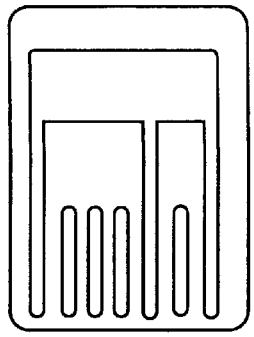
FIGS. 3A, 3B, and 3C are diagrams showing patterns for configuring cartridges with printed wiring boards.
Figure 3B:
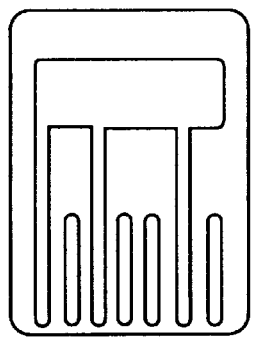
Figure 3C:
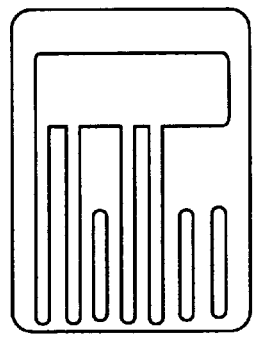

FIGS. 3A, 3B, and 3C show examples of patterns for configuring the cartridge 300 with a printed wiring board. Cartridge A, cartridge B, and cartridge C shown in FIG. 3 are the patterns wherein three or four wires out of seven are shorted, which is configured as a part of the printed wiring board.

Quite a few combinations are available for generating different patterns in selecting which of the seven wires are to be shorted out, so that each pattern can be assigned a specific meaning for each cartridge holding its intrinsic data. As an unconventional embodiment, a simple configuration wherein a metal plate is processed to short out at specific contacting points when it is connected to the electronic pen can be used.

The electronic pen main unit connecting segment 330 is a connecting segment to transfer the data of the data holding segment 320 to the electronic pen main unit 200, and it is a connecting segment with the cartridge connecting segment 230 which is in the electronic pen main unit.

Figure 4:
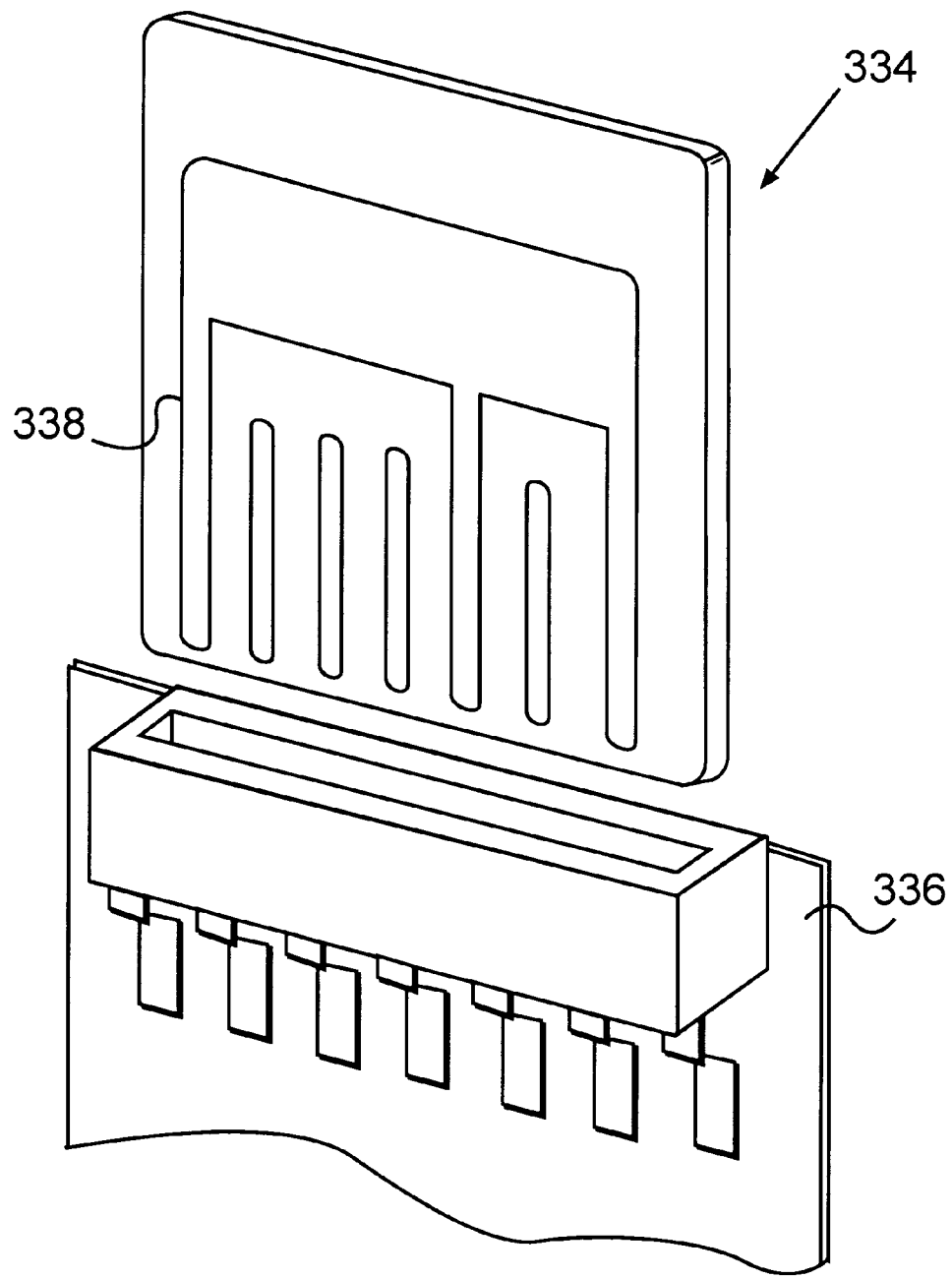
FIG. 4 is an example of accomplishing a union between a cartridge and a main body of an electronic pen through an edge connector.

The simplest way to accomplish the connection is, as shown in FIG. 4, to conduct the mechanical connection and electric contact as well, making the electronic pen main unit connecting segment 330 in the cartridge 300 as simply a printed wiring board segment 334, and making the cartridge connecting segment 230 in the electronic pen main unit 200 as a mounted edge connector 336 to the printed wiring board which is part of the electronic pen main unit. The printed wiring board segment 334 includes a short pattern 338. FIG. 4 is an external view of an example realizing a connection between a cartridge and an electronic pen main unit by the edge connector 336. It is also possible to use a conventional connector instead of using the card edge connector.

Figure 5:
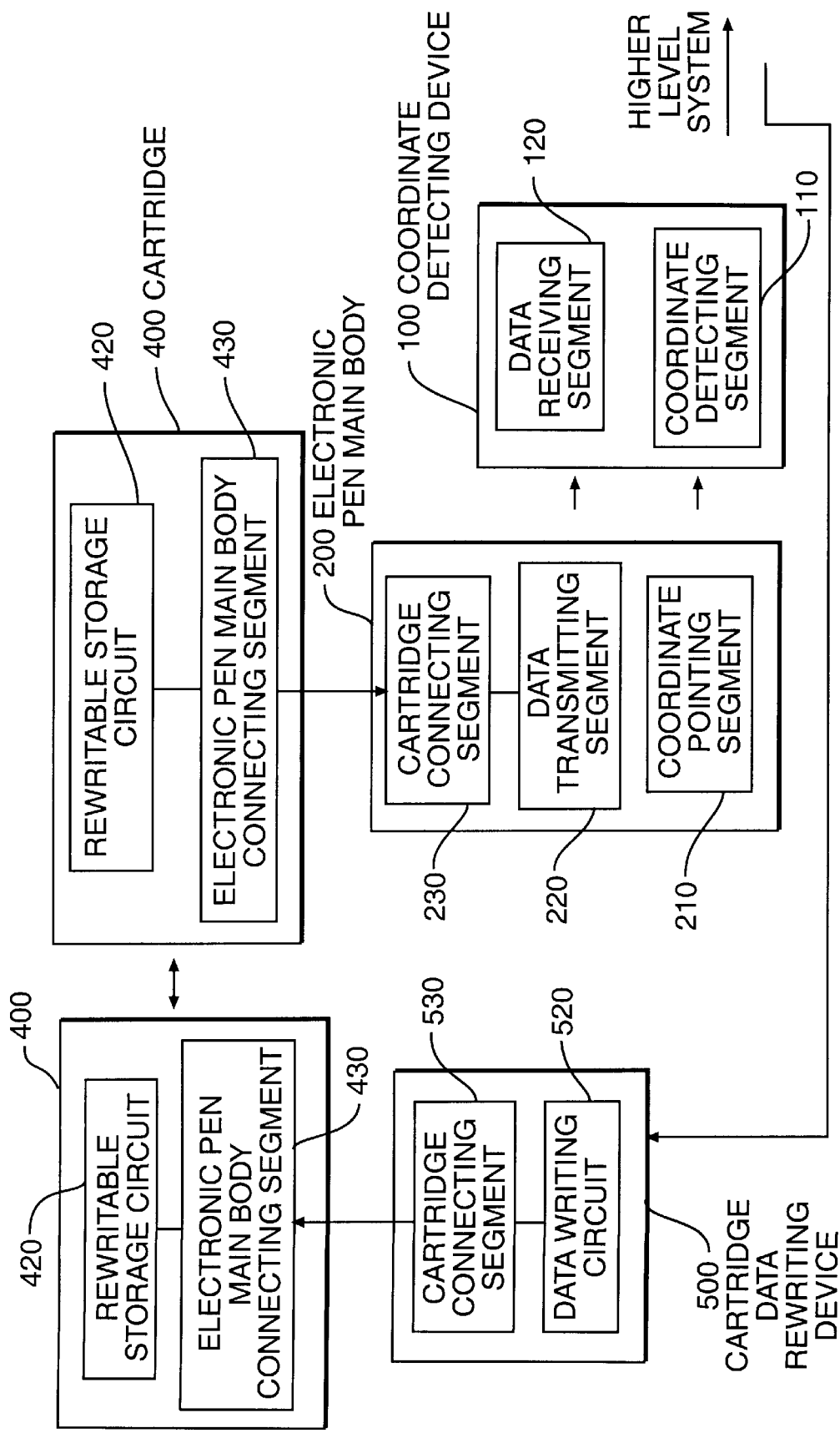
FIG. 5 is a block diagram showing an embodiment of a cordless electronic pen with a cartridge equipped with a writable storage circuit.

FIG. 5 is a block diagram of an embodiment of a cordless electronic pen with a cartridge equipped with a rewriteable storage circuit. Data held in the data holding segment 320 of the cartridge 300 shown in FIG. 2 is fixed information, which cannot be rewritten. The rewriteable storage circuit 420 in the cartridge 400 shown in FIG. 5 can store information which can be rewritten.

A rewriteable storage circuit 420 can be implemented, for example, by loading an EEPROM for small size information storage, or by loading a flash memory card for large size storage on the cartridge 400. The configuration of the coordinate detecting device 100 and the electronic pen main unit 200 in FIG. 5 are the same as in FIG. 2, which are shown by the same numbers. A cartridge rewriting device 500 is installed based on the general requirement for a higher voltage to write to a rewriteable memory than the voltage required for reading.

Writing usually requires a higher voltage (occasionally voltage might be negative) than reading. For example, Seiko Instruments' EEPROM "S-29X3CR/I" operates from a power supply of 1.8 volts and above for reading, but requires 2.7 volt and above for writing. As an example of a flash memory, Fujitsu's "MBM28F10" requires 5 volts and above for reading, but requires at least 12 volts for writing. It is extremely difficult to equip a power supply within an electronic pen with these higher voltages. The present invention, therefore, makes the segment including a rewriteable storage circuit as a cartridge, and provides a writing device separately.

The cartridge rewriting device 500 includes of the cartridge connecting segment 530 and the data writing circuit 520. The cartridge connecting segment 530 is the same as the cartridge connecting segment 320 of the electronic pen main unit. The data writing circuit 520 can be an existing one such as a ROM writer. An arrow from a higher level system is pointed at the data writing circuit 520 in FIG. 5 by using a computer keyboard, which is a higher level system, as an input device for the data writing in order to minimize the circuit for the cartridge rewriting device 500.

FIG. 6B is an external view of the cartridge data rewriting device 500 and the cartridge 400 equipped with rewriteable storage. The cartridge data rewriting device 500 shown in FIG. 6B can be connected to a higher level system, allowing the content input by the keyboard, to be changed on the display screen before rewriting new information. FIG. 6A shows the cartridge 400 connecting to a pen 200.

Figure 7:
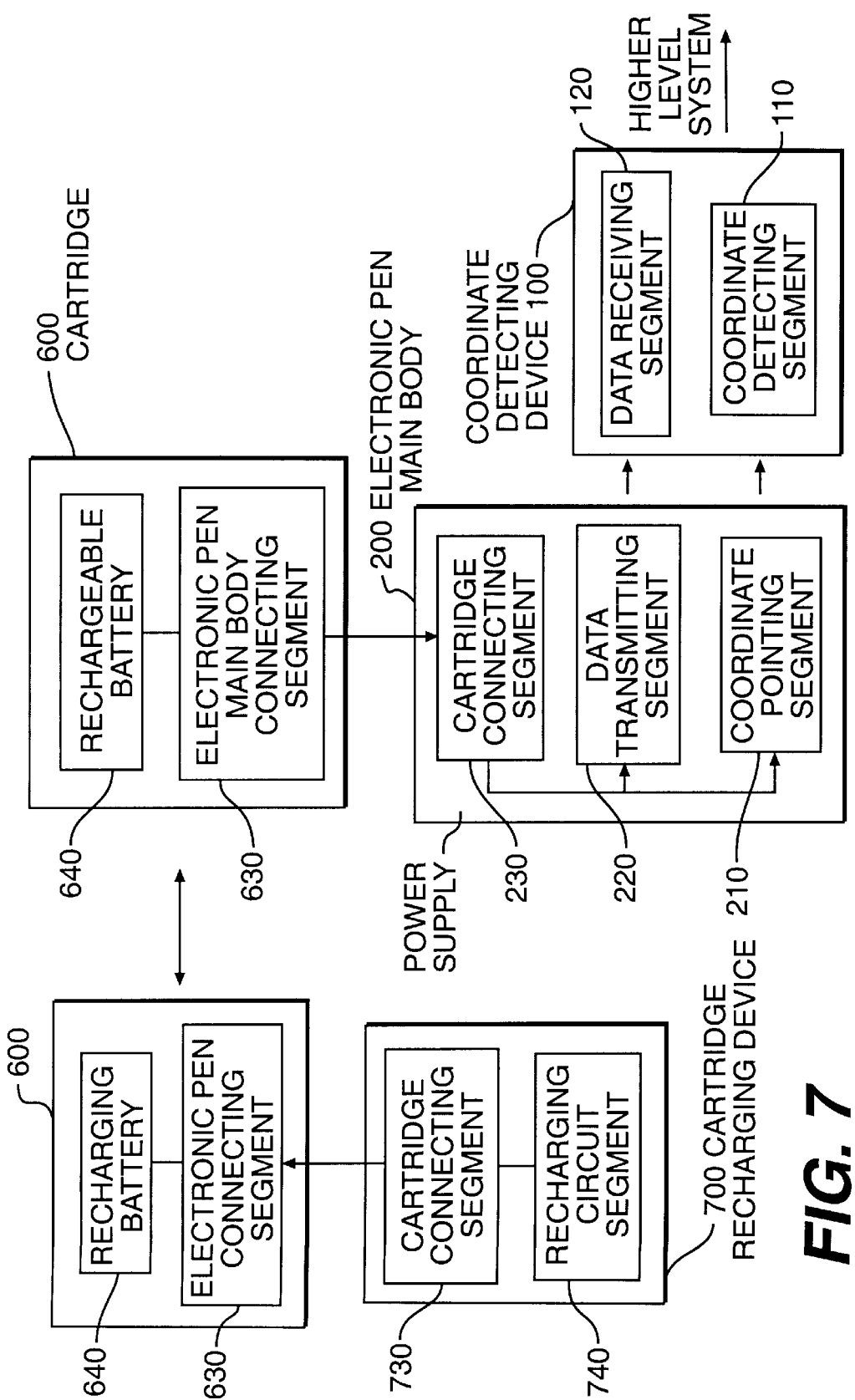
FIG. 7 is a block diagram showing an embodiment of a cordless electronic pen with a cartridge equipped with a rechargeable battery.

FIG. 7 is a block diagram of an embodiment for a cordless electronic pen with a cartridge possessing a rechargeable battery. It is a characteristic of the present invention that the cartridge 600 is equipped with rechargeable battery 640 and a cartridge recharging device 700. The configuration of the electronic pen main body 200 and the configuration of the coordinate detecting device 100 are the same as in the embodiment shown in FIG. 2.

In recent years, the specifications for a rechargeable battery have been improving and many of them are small-sized. It is a troublesome requirement for a user to remove a rechargeable battery installed inside an electronic pen, and recharge the battery. By extending the terminal necessary for recharging to the connecting segment of the cartridge, recharging can be easily accomplished by the cartridge recharging device 700.

Improvement to the rechargeable battery in recent years are geared to maximizing performance, which in turn requires that a recharging circuit have sophisticated control measures to safely recharge the battery and to avoid the possibility of explosion and/or any other danger.

Figure 8B:
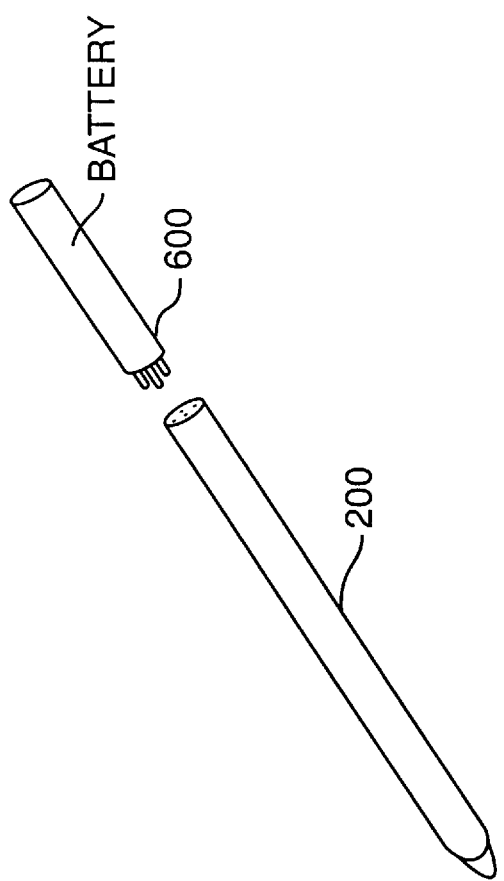
FIGS. 8A and 8B are external views showing a cartridge 600 equipped with an internal rechargeable battery, a pen, and a cartridge recharging device 700.
Figure 8A:
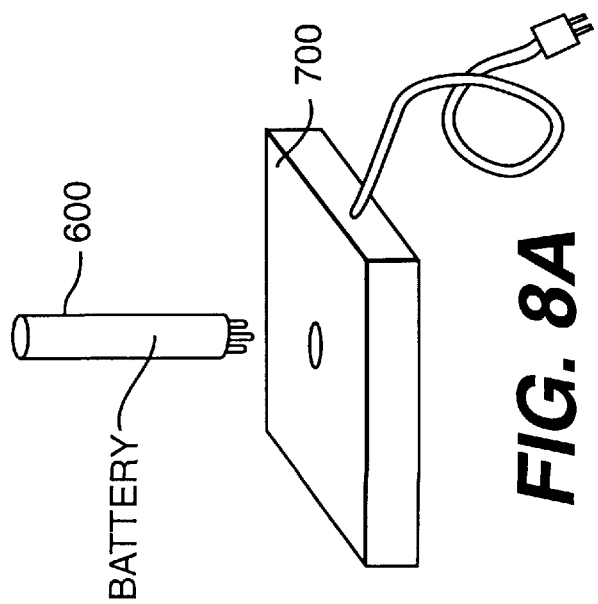

For safety, the recharging circuit should not be limited in size. It is preferred to recharge the battery by using a special purpose recharging device such as this cartridge recharge device, and to prohibit a user form recharging the battery in any other way. FIG. 8A is an external view of the cartridge 600 with a built-in rechargeable battery and a cartridge recharging device 700. FIG. 8B shows the cartridge 600 connecting to a pen 200.

A cartridge equipped with both rewriteable storage and a rechargeable battery can also be implemented.

Connection means without a physical contact are possible in many different ways, one example of which is by a combination of lead switches operated by magnets.

By the present invention various functions can be set on the electronic pen without being troubled by operating small switches. The present invention also enables the recognition of a content of a setting through the shape or color of a cartridge. An application to a security function also becomes available. By using a connector of the cartridge, recharging the built-in battery in the cartridge, and writing information to a built-in storage device in the cartridge without burdening the electronic pen main body becomes available.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A position pointing device for use with a position detecting device, comprising:

a pen-shaped body; and a cartridge removably connectable to the pen-shaped body to establish an electronic connection between the cartridge and the pen-shaped body, the cartridge including an information storage structure.

2. A position pointing device as claimed in claim 1, wherein the position pointing device is cordless, and the position detecting device detects the position pointing device by electrical induction.

3. A position pointing device as claimed in claim 1, wherein the information storage structure comprises a printed circuit card having a wiring pattern corresponding to the stored information.

4. A position pointing device as claimed in claim 1, wherein the cartridge and the pen-shaped body are electrically connected.

5. A position pointing device as claimed in claim 4, wherein the electrical connection does not include a physical connection.

6. A position pointing device as claimed in claim 1, wherein the information storage structure stores information identifying a color.

7. A position pointing device as claimed in claim 6, wherein the color of the cartridge matches the color identified by the information.

8. A position pointing device as claimed in claim 1, wherein the information storage structure stores a security code.

9. A position pointing device as claimed in claim 1, wherein the information storage structure stores information identifying a line width.

10. A position pointing device for use with a position detecting device, comprising:
   a pen-shaped body; and
   a cartridge removably connectable to the pen-shaped body to establish an electronic connection between the cartridge and the pen-shaped body, the cartridge including a power storage structure.

11. A position pointing device as claimed in claim 10, wherein the position pointing device is cordless, and the position detecting device detects the position pointing device by electrical induction.

12. A position pointing device as claimed in claim 10, wherein the power storage structure comprises a rechargeable battery.

13. A position pointing device for use with a position detecting device, comprising:
   a pen-shaped body; and
   a cartridge removably connectable to the pen-shaped body to establish an electronic connection between the cartridge and the pen-shaped body, the cartridge including a memory.

14. A position pointing device as claimed in claim 13, wherein the position pointing device is cordless, and the position detecting device detects the position pointing device by electrical induction.

15. A position pointing device as claimed in claim 13, wherein the memory is rewriteable.

16. A position pointing device as claimed in claim 15, wherein the memory comprises an EEPROM.

17. A position pointing device as claimed in claim 15, wherein the memory comprises a flash memory.

18. A position pointing device as claimed in claim 13, wherein the cartridge and the pen-shaped body are electrically connected.

19. A position pointing device as claimed in claim 18, wherein the electrical connection does not include a physical connection.

20. A position pointing device as claimed in claim 13, wherein the information storage structure stores information identifying a color.

21. A position pointing device as claimed in claim 20, wherein the color of the cartridge matches the color identified by the information.

22. A position pointing device as claimed in claim 13, wherein the information storage structure stores a security code.

23. A position pointing device as claimed in claim 13, wherein the information storage structure stores information identifying a line width.

\* \* \* \* \*